INVENTORS
MARION E. HINES
ARTHUR A. BLAISDELL
BY
Roen & Schiller
ATTORNEYS

INVENTORS
MARION E. HINES
ARTHUR A. BLAISDELL
BY Rosen and Schiller
ATTORNEYS

United States Patent Office 3,281,647

Patented Oct. 25, 1966

3,281,647

FREQUENCY MULTIPLIER UTILIZING TWO DIODES IN SERIES OPPOSITION ACROSS THE WIDE WALLS OF A WAVEGUIDE

Marion E. Hines, Weston, and Arthur A. Blaisdell, Natick, Mass., assignors to Microwave Associates, Inc., Burlington, Mass., a corporation of Massachusetts Filed Oct. 1, 1962, Ser. No. 227,282

19 Claims. (Cl. 321—69)

This invention relates in general to electric wave frequency multiplier circuits, and more particularly to solid state harmonic generators which can be used as power sources at microwave frequencies.

While solid state devices have been developed to the state where they are useful in signal generating circuits and power supplies, electron tube oscillators are still required as power sources at microwave frequencies. Thus, for example, klystrons continue to dominate as power sources at S-band (3,000 mc./sec.), X-band (9,000 mc./sec.) and above, and the advantages of low size and weight, low power drain, and simplicity of structural design are as yet not available in such microwave power sources.

A promising approach to the generation of microwave signals involves frequency multiplication through the use of non-linear impedance diode devices in harmonic generator circuits. Particularly advantageous in such circuits are the non-linear voltage-variable capacitance diodes sometimes known as "varactors." Such devices can be driven from transistor power amplifiers, providing all-solid-state microwave sources with significant advantages compared with electron tube oscillators. The major advantages include precise frequency control and all-solid-state reliability.

It is accordingly the principal object of this invention to improve the art of solid state microwave power sources. More specific objects of the invention are to provide solid state electric wave generators having improved efficiency, and increased bandwidth with high efficiency, and which can be realized in waveguides and coaxial lines. A further specific object is to provide such generators in the form of frequency multipliers which generate only the even harmonics of a fundamental input frequency, and which can function as frequency doublers of high efficiency and stability, as well as having broad bandwidth. Another object is to provide such solid state frequency doublers which can be incorporated into multistage harmonic generators.

According to the invention in one of its general aspects, there is provided an electric circuit for generating an even harmonic frequency wave from the energy content of an input electric wave having a given fundamental frequency, in which the input wave is applied through a waveguide circuit in push-pull balanced phase (±) to a pair of series-opposition connected varactors, and the output is taken from the varactors in parallel phase

In this circuit, because of symmetry, the even harmonics are substantially excluded from the input, and the fundamental frequency and its odd harmonics are substantially excluded from the output. The circuit is easily designed to assure that the output is primarily the second harmonic of the input fundamental frequency.

The foregoing and other objects and feautres of the invention will become apparent from the following description of certain exemplary embodiments. This description refers to the accompanying drawings, wherein.

Figure 1:
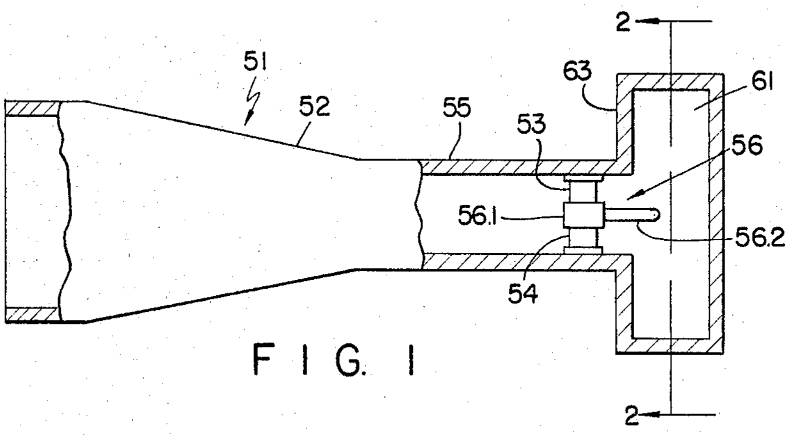
FIG. 1 is a side elevation, partly in section, of a circuit according to the invention realized in waveguide.
Figure 2:
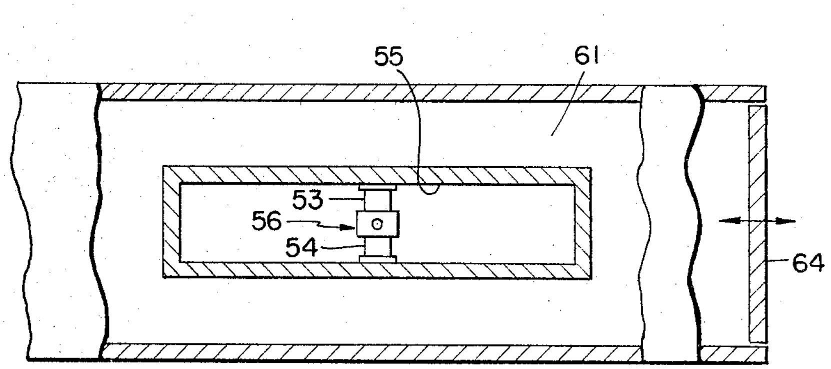
FIG. 2 is a view, partly in section, taken along line 2—2 of FIG. 1.
Figure 3:
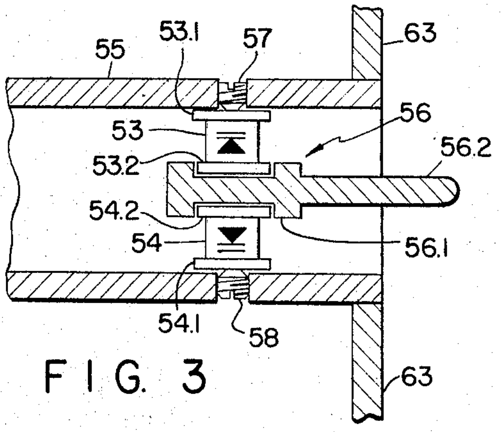
FIG. 3 is an enlarged view of a portion of FIG. 1.

FIGS. 1, 2 and 3 illustrate a frequency doubler realized in microwave waveguide, for use in the microwave range. The particular waveguide sizes which are mentioned in the following description were used in the fabrication of a frequency doubler from an input fundamental frequency of 4500 mc./sec. to an output second harmonic frequency of 9000 mc./sec. The input terminals comprise a section 51 of RG–49/U waveguide with a tapered portion 52 to reduce the height of the waveguide. Two varactors 53 and 54 are mounted in series opposition across the reduced-height section 55 of the input waveguide and a conductor 56 is mounted between them in contact with like-polarity electrodes of both varactors. Referring to FIG. 3, which shows this portion of FIG. 1 in enlarged section, the varactors 53 and 54 have flat terminals 53.1, 53.2, 54.1 and 54.2, respectively. The varactors are shown in series opposition, with the base 56.1 of the conductor 56 clamped between one pair of two like-polarity electrodes 53.2 and 54.2. The remaining pair of like-polarity electrodes 53.1 and 54.1 confront, respectively, the opposite wide walls of the reduced height input waveguide section 55. Set screws 57 and 58, respectively, threaded one in each wide wall are used to clamp the varactors and base 56.1 in place in the input waveguide and to make electrical contact, respectively, with these remaining electrodes 53.1 and 54.1. The conductor has an extended element 56.2 extending through the open end of the input waveguide into the output waveguide 61.

The output waveguide 61 comprises a section of RG–52/U waveguide mounted transversely across the open end of the reduced height part 55 of the input waveguide 51, oriented so that there is substantially no dominant mode coupling from the output waveguide 61 to the input waveguide 51, thereby contributing isolation between the input and the output circuits. The extended conductor element 56.2 serves to provide symmetrical coupling from the two varactors 53 and 54 to the output waveguide, which is apertured in one wide wall 63 to receive the open end of the input waveguide reduced-height section 55.

It will be apparent to those skilled in the art that if an input signal in the dominant mode for rectangular waveguide is introduced via the input waveguide 51, the voltage of this signal will be applied in push-pull across the two varactors 53 and 54 in series opposition, and that the extended conductor element 56.2 is disposed to couple the varactors in parallel with the dominant mode in the output waveguide 61. One end of the output waveguide 61 is closed with a short-circuit, which may be in the form of a movable plate 64.

It is thus apparent that the two varactors 53 and 54 in FIG. 1 are in connected series opposition relative to the input circuit and that an alternating input signal voltage will be applied in push-pull or balanced (±) phase to the two varactors. It is also apparent that these same two varactors are in parallel phase

relative to the output circuit. Because of the symmetry which inheres in this arrangement, the fundamental frequency of the input signal, and its odd harmonics (3rd, 5th, etc.) are essentially excluded from the output circuit 61, and the even harmonics (2nd, 4th, 6th, etc.) of the input fundamental frequency are essentially excluded from the input circuit 51. The varactor mounting technique which is illustrated and described above, provides an excellent heat sink for each varactor, further enhancing the reliable power handling capability of this design.

Figure 5:
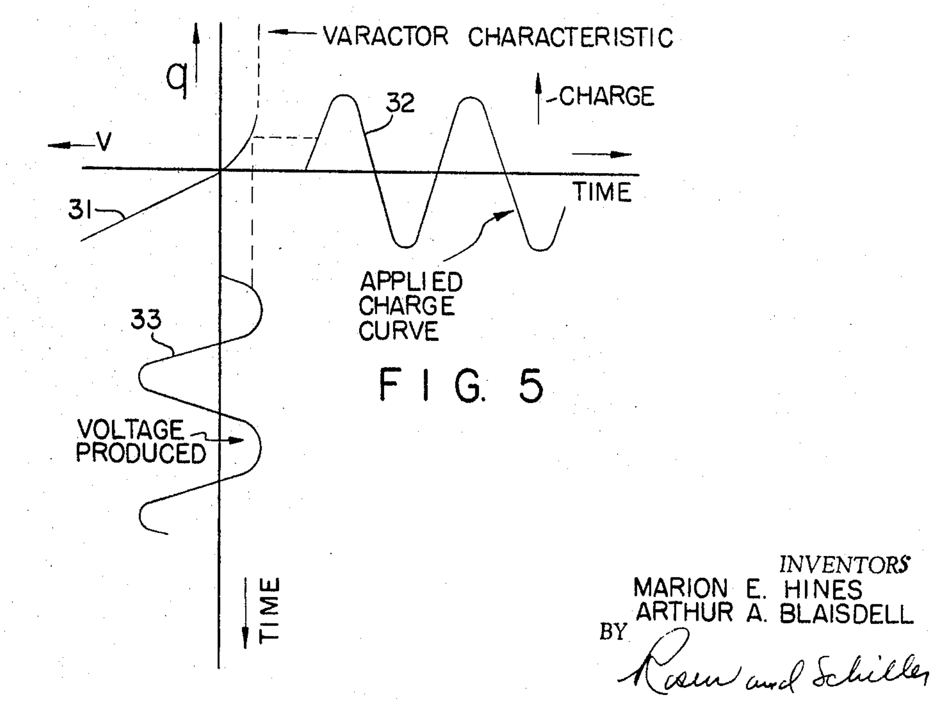
FIG. 5 is a set of graphs useful to explain the invention as practiced with varactors.

The curve 31 of FIG. 5 shows the charge-vs-voltage relationship for an ideal (non-conducting, zero resistance) varactor of the graded-junction type. Also shown in FIG. 5 are an "applied charge curve" 32 and a "voltage produced" curve 33, which present a graphical technique for waveform analysis. In the applied charge curve, it is assumed that the charge (and current) are sinusoidal functions of time at a single (i.e., the fundamental) frequency. The voltage which appears at the varactor is seen (curve 33) to be highly distorted, and rich in harmonics. It is apparent that the production of harmonics is enhanced by driving the varactor into the "forward conduction" region. In actual use, currents flow at harmonic requencies as well as at the fundamental frequency.

It is also apparent that the time-average voltage is an important parameter in harmonic generation. It has a profound effect on the impedance of the varactor and the efficiency in harmonic conversion. This voltage can be established with D.C. bias which can be provided through by-pass capacitors or RF chokes. In actual practice it is often satisfactory to provide no external bias, leaving the varactor open-circuited at D.C. The varactor then sets its own bias through the process of rectification.

For best operation of a frequency doubler according to FIGS. 1–3, the two varactors used should preferably have similar characteristics, to minimize coupling of second harmonic to the input circuit, and consequent reduced efficiency, which can result from the unbalance introduced by dissimilar varactors.

In a double embodiment according to FIGS. 1–3 which was built, two varactors 53 and 54 each having a capacitance at zero bias of 1.0 pf. were installed, and the double was tuned for best operation from an input of 4,400 mc./sec. to an output of 8,800 mc./sec., and the following data were recorded:

TABLE I

| Input Frequency (mc./sec.) | Input VSWR | Input Power (mw.) | Output Power (mw.) | Overall Efficiency, percent | Multiplier [1] Efficiency, percent |
|---|---|---|---|---|---|
| 4,400 | 2.6 | 500 | 265 | 53 | 66 |
| 4,400 | 2.8 | 750 | 387 | 51.6 | 66.5 |
| 4,400 | 2.9 | 1,000 | 490 | 49 | 64.2 |
| 4,400 | 3.4 | 1,500 | 633 | 42.2 | 60 |
| 4,400 | 4.0 | 2,000 | 740 | 37 | 57.8 |

[1] Multiplier efficiency computed by correcting for the fundamental power reflected in the input circuit.

The input circuit was carefully examined for harmonics; the total harmonic content in the input circuit was found to be negligible. In order to evaluate the performance of this unit on a broad-band basis, the following data were taken with the frequency doubler output circuit tuned for optimum performance at 500 nw. of driving input signal at 4,400 mc./sec.

TABLE II

| Input Frequency (mc./sec.) | Input VSWR | Input Power (mw.) | Output Power (mw.) | Overall Efficiency, percent | Multiplier [1] Efficiency, percent |
|---|---|---|---|---|---|
| 4,200 | 2.7 | 500 | 42 | | |
| 4,300 | 2.6 | 500 | 70 | 14 | 17.4 |
| 4,400 | 2.6 | 500 | 265 | 53 | 66 |
| 4,500 | 7.5 | 500 | 80 | 16 | 38.5 |
| 4,600 | 9.0 | 500 | 35 | 7 | 19.4 |

By retuning the adjustable short circuit 64 in the output waveguide 61 for optimum power out at each frequency, the following results were obtained:

TABLE III

| Input Frequency (mc./sec.) | Input VSWR | Input Power (mw.) | Output Power (mw.) | Overall Efficiency, percent | Multiplier [1] Efficiency, percent |
|---|---|---|---|---|---|
| 4,200 | 2.4 | 500 | 85 | 17 | 20.8 |
| 4,300 | 2.6 | 500 | 180 | 36 | 45 |
| 4,500 | 2.9 | 500 | 200 | 40 | 52.4 |
| 4,600 | 4.7 | 500 | 135 | 27 | 46.7 |

These results can be further improved by improving the input match and broadbanding the output coupling, each of which requires only known microwave techniques.

The power output of a harmonic generator using varactors is not proportional to the power input. Weak input signals produce little or no harmonics because nonlinear effects appear only when the varactor capacitance varies significantly during each cycle of input drive. As the input power level is increased, harmonic output rises sharply, and then saturates. A varactor produces many harmonics when strongly driven. Normal circuit tuning can be designed to favor the harmonic desired, and additional filtering may be employed if the system application to which the harmonic generator is addressed requires extremely pure signals. It will be appreciated that, while the foregoing embodiment has been described in connection with varactors, the invention is not so limited, and may be practiced with any non-linear impedance diode devices.

Figure 4A:
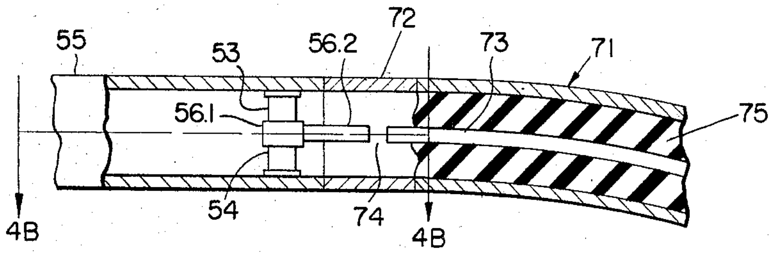
FIGS. 4A and 4B illustrate a circuit according to the invention realized in waveguide and coaxial line components.
Figure 4B:
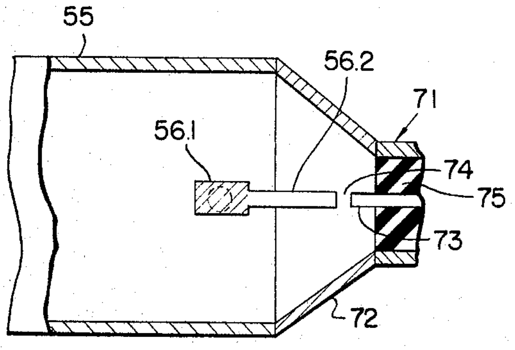

FIGS. 4A and 4B illustrate another embodiment of the invention, in which the input portion is identical with that of FIG. 1, but the output portion is realized in a coaxial line 71, in place of the waveguide output 61 of FIG. 1. The waveguide portion 55 of reduced height is shown, with the varactors 53 and 54, and the conductor base 56.1 and extended element 56.2, the same as in FIG. 1. A tapered waveguide transition section 72 is connected to the open end of the reduced-height section 55, and reduces the width of the waveguide to a dimension suitable for coupling with the coaxial line 71. The inner conductor 73 of the coaxial line is electrically coupled to the extended conductor element 56.2; this may be done by a direct electrical connection, or through a gap 74 as shown, which functions as a capacitive coupler. The coaxial cable 71 may have a solid dielectric 75, as shown, or it may be of another type, as desired. The coaxial cable is shown schematically connected to the transition section 72; it will be realized that in practice a suitable connector, of which many are known and commercially available, may be used.

The circuit of FIGS. 4A and 4B functions in the same manner as that of FIGS. 1–3. The input fundamental frequency is applied to the diodes 53 and 54 in push-pull balanced phase, and the output second harmonic circuit has the diodes in parallel phase.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. Electric waveguide circuit for generating an even harmonic frequency wave from the energy content of an electric wave having a given fundamental frequency comprising: first and second non-linear impedance diode means, circuit means interconnecting like-polarity electrodes of said diode means, an input waveguide circuit for said fundamental frequency wave, means coupling said input waveguide circuit to the remaining electrodes of said diode means for application of said wave in push-pull to said diode means, and an output circuit including said interconnecting means having said diode means in parallel for deriving an output electric wave at a frequency which is an even harmonic of said fundamental frequency.

2. Electric waveguide circuit for generating an even harmonic frequency wave from the energy content of an electric wave having a given fundamental frequency comprising: first and second non-linear impedance diode means, circuit means interconnecting like-polarity electrodes of said diode means, an input waveguide circuit for said fundamental frequency wave, means coupling said input waveguide circuit to the remaining electrodes of said diode means for application of said wave in push-pull to said diode means, and an output waveguide circuit including said interconnecting means having said diode means in parallel for deriving an output electric wave at a frequency which is an even harmonic of said fundamental frequency.

3. Electric waveguide circuit for generating an even harmonic frequency wave from the energy content of an electric wave having a given fundamental frequency comprising: first and second non-linear impedance diode means, circuit means interconnecting like-polarity electrodes of said diode means, an input waveguide circuit for said fundamental frequency wave, means coupling said input waveguide circuit to the remaining electrodes of said diode means for application of said wave in push-pull to said diode means, and an output coaxial-line circuit including said interconnecting means having said diode means in parallel for deriving an output electric wave at a frequency which is an even harmonic of said fundamental frequency.

4. Electric waveguide circuit for generating an even harmonic frequency wave from the energy content of an electric wave having a given fundamental frequency comprising: first and second non-linear impedance diode means, waveguide means interconnecting a first pair of like-polarity electrodes of said diode means, a conductive connection between the second pair of like-polarity electrodes of said diode means, an input waveguide circuit for said fundamental frequency wave coupled to said waveguide means for coupling said input wave in push-pull to said diode means, and an output circuit including said conductive connection having said diode means in parallel for deriving an output electric wave at a frequency which is an even harmonic of said fundamental frequency.

5. Electric waveguide circuit for generating an even harmonic frequency wave from the energy content of an electric wave having a given fundamental frequency comprising: first and second non-linear impedance diode means, waveguide means interconnecting a first pair of like-polarity electrodes of said diode means, a conductive connection between the second pair of like-polarity electrodes of said diode means, an input waveguide circuit for said fundamental frequency wave coupled to said waveguide means for coupling said input wave in push-pull to said diode means, and a waveguide output circuit including said conductive connection having said diode means in parallel for deriving an output electric wave at a frequency which is an even harmonic of said fundamental frequency.

6. Electric waveguide circuit for generating an even harmonic frequency wave from the energy content of an electric wave having a given fundamental frequency comprising: first and second non-linear impedance diode means, waveguide means interconnecting a first pair of like-polarity electrodes of said diode means, a conductive connection between the second pair of like-polarity electrodes of said diode means, an input waveguide circuit for said fundamental frequency wave coupled to said waveguide means for coupling said input wave in push-pull to said diode means, and a coaxial-line output circuit including said conductive connection having said diode means in parallel for deriving an output electric wave at a frequency which is an even harmonic of said fundamental frequency.

7. Electric waveguide circuit for generating an even harmonic frequency wave from the energy content of an electric wave having a given fundamental frequency comprising: first and second non-linear impedance diode means, an input waveguide for propagating said fundamental frequency, means connecting said diode means in series opposition across said input waveguide, output coupling means connected between the like-polarity intermediate electrodes of said diode means, and an output circuit having said diode means in parallel coupled between said waveguide and said output coupling means for deriving an output electric wave at a frequnecy which is an even harmonic of said fundamental frequency.

8. Electric waveguide circuit for generating an even harmonic frequency wave from the energy content of an electric wave having a given fundamental frequency comprising: first and second non-linear impedance diode means, an input waveguide for propagating said fundamental frequency, means connecting said diode means in series opposition across said input waveguide, output coupling means connected between the like-polarity intermediate electrodes of said diode means, and an output waveguide circuit having said diode means in parallel coupled between said input waveguide and said output coupling means for deriving an output electric wave at a frequency which is an even harmonic of said fundamental frequency.

9. Electric waveguide circuit for generating an even harmonic frequency wave from the energy content of an electric wave having a given fundamental frequency comprising: first and second non-linear impedance diode means, an input waveguide for propagating said fundamental frequency, means connecting said diode means in series opposition across said input waveguide, output coupling means connected between the like-polarity intermediate electrodes of said diode means, and an output coaxial-line circuit having said diode means in parallel coupled between said waveguide and said output coupling means for deriving an output electric wave at a frequency which is an even harmonic of said fundamental frequency.

10. Electric waveguide circuit for generating an even harmonic frequency wave from the energy content of an electric wave having a given fundamental frequency comprising: first and second non-linear impedance diode means, an input waveguide for propagating said fundamental frequency, means connecting said diode means in series opposition across said input waveguide, a conductive conductor connected between the like-polarity intermediate diode electrodes of said diode means, an output waveguide coupled to said input waveguide, said conductor extending into said output waveguide for generating therein an output electric wave at a frequency which is an even harmonic of said fundamental frequency, said output waveguide dimensioned to propagate said output electric wave as the dominant mode therein.

11. Electric waveguide circuit for generating an even harmonic frequency wave from the energy content of an electric wave having a given fundamental frequency comprising: first and second non-linear impedance diode means, an input waveguide for propagating said fundamental frequency, means connecting said diode means in series opposition across said input waveguide, a conductor connected between the like-polarity intermediate diode electrodes of said diode means, an output coaxial line coupled to said input waveguide, said conductor being coupled to the inner conductor of said coaxial line for generating therein an output electric wave at a frequency which is an even harmonic of said fundamental frequency, said output coaxial line being dimensioned to propagate said output electric wave.

12. Electric waveguide circuit for generating an even harmonic frequency wave from the energy content of an electric wave having a given fundamental frequency comprising: first and second non-linear impedance diode means, an input rectangular waveguide dimensioned for propagating said fundamental frequency as the dominant mode therein and having an open end, means connecting said diode means in series-opposition across the wide walls of said input waveguide adjacent said open end, a conductor connected between the like-polarity intermediate electrodes of said diode means and extending axially through said open end, an output rectangular waveguide having an opening in one wide wall thereof coupled via said opening to said open end disposed with its longitudinal axis transverse to the longitudinal axis of said input waveguide, said conductor extending toward the opposite wide wall of said output waveguide, for generating therein an output electric wave at a frequency which is an even harmonic of said fundamental frequency, said output waveguide dimensioned to propagate said output electric wave as the dominant mode therein.

13. Electric waveguide circuit for generating an even harmonic frequency wave from the energy content of an electric wave having a given fundamental frequency comprising: first and second non-linear impedance diode means, in input rectangular waveguide dimensioned for propagating said fundamental frequency and having an open end, means connecting said diode means in series-opposition across the wide walls of said input waveguide adjacent said open end, a conductor connected between the like-polarity intermediate electrodes of said diode means and extending axially through said open end, an output coaxial line coupled at one end to said open end and disposed with its longitudinal axis in register with the longitudinal axis of said input waveguide, said conductor extending toward the inner conductor of said coaxial line for generating therein an output electric wave at a frequency which is an even harmonic of said fundamental frequency, said output coaxial line being dimensioned to propagate said output electric wave.

14. Electric waveguide circuit for generating an even harmonic frequency wave from the energy content of an electric wave having a given fundamental frequency comprising: a pair of non-linear impedance diode means connected in series opposition one to the other, waveguide means to apply an input electric wave having said fundamental frequency in push-pull balanced phase across said diode means in series, and waveguide means to derive an output electric wave having a frequency which is an even harmonic of said fundamental frequency from said diode means in parallel with each other.

15. Electric waveguide circuit for generating an even harmonic frequency wave from the energy content of an electric wave having a given fundamental frequency comprising: a pair of non-linear impedance diode means connected in series opposition one to the other, waveguide means to apply an input electric wave having said fundamental frequency in push-pull balanced phase across said diode means in series, and coaxial line means to derive an output electric wave having a frequency which is an even harmonic of said fundamental frequency from said diode means in parallel with each other.

16. Electric waveguide circuit means comprising: first and second non-linear impedance diode means, a rectangular waveguide, means connecting said diode means in series-opposition across a pair of opposite walls of said waveguide, and a conductor connected between the like-polarity intermediate electrodes of said diode means and extending substantially axially of said waveguide.

17. Electric waveguide circuit means comprising: first and second non-linear impedance diode means, a rectangular waveguide, means connecting said diode means in series-opposition across the wide walls of said waveguide, and a conductor connected between the like-polarity intermediate electrodes of said diode means and extending substantially axially of said waveguide.

18. Electric waveguide circuit means comprising: a rectangualr waveguide, first and second non-linear impedance diode means each having a substantially flat electrode at each end, a conductor having a base portion with substantially flat parallel opposite surfaces and an elongated piece extending from said base portion, said diode means being collinearly located within and across said waveguide with one pair of like-polarity electrodes each in contact with one of said surfaces of said base portion and the second pair of like-polarity electrodes confronting respectively the members of a pair of opposite walls of said waveguide, means in association with said walls for clamping said second electrodes between them whereby to hold said diode means with said base portion clamped between them across said waveguide, said elongated piece extending substantially axially of said waveguide.

19. Electric waveguide circuit means comprising: a rectangular waveguide, first and second non-linear impedance diode means each having a substantially flat electrode at each end, a conductor having a base portion with substantially flat parallel opposite surfaces and an elongated piece extending from said base portion, said diode means being collinearly located within and across the narrow dimension of said waveguide with one pair of like-polarity electrodes each in contact with one of said surfaces of said base portion and the second pair of like-polarity electrodes confronting respectively the opposite wide walls of said waveguide, means in association with said walls for clamping said second electrodes between them whereby to hold said diode means with said base portion clamped between them across said waveguide, said elongated piece extending substantially axially of said waveguide.

References Cited by the Examiner

UNITED STATES PATENTS

| | | | |
|---|---|---|---|
| 2,982,922 | 5/1961 | Wilson | 331—76 |
| 3,067,394 | 12/1962 | Zimmerman et al. | 333—17 |
| 3,071,729 | 1/1963 | Schiffman | 330—4.9 |
| 3,230,464 | 1/1966 | Grace | 330—4.9 |

OTHER REFERENCES

"Parallel Varactor Diode Frequency Multiplier," by E. A. Jelesiewicz, published in R.C.A. Technical Notes (RCA TN No. 650), November 1965, sheets 1 and 2.

"Sharpe Threshold Gate," by E. L. Willette, published in R.C.A. Technical Notes (RCA TN No. 428), January 1961.

JOHN F. COUCH, *Primary Examiner.*

LLOYD McCOLLUM, *Examiner.*

G. J. BUDOCK, G. GOLDBERG, *Assistant Examiners.*